United States Patent
Gao et al.

(10) Patent No.: US 12,341,988 B2
(45) Date of Patent: Jun. 24, 2025

(54) SYSTEMS AND METHODS FOR MOTION VECTOR PREDICTOR LIST IMPROVEMENTS

(71) Applicant: Tencent America LLC, Palo Alto, CA (US)

(72) Inventors: Han Gao, Palo Alto, CA (US); Xin Zhao, Palo Alto, CA (US); Liang Zhao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 157 days.

(21) Appl. No.: 18/196,368

(22) Filed: May 11, 2023

(65) Prior Publication Data

US 2023/0396794 A1    Dec. 7, 2023

Related U.S. Application Data

(60) Provisional application No. 63/349,754, filed on Jun. 7, 2022.

(51) Int. Cl.
*H04N 19/137* (2014.01)
*H04N 19/105* (2014.01)
(Continued)

(52) U.S. Cl.
CPC ........... *H04N 19/52* (2014.11); *H04N 19/105* (2014.11); *H04N 19/132* (2014.11);
(Continued)

(58) Field of Classification Search
CPC .... H04N 19/52; H04N 19/105; H04N 19/132; H04N 19/139; H04N 19/159;
(Continued)

(56) References Cited

U.S. PATENT DOCUMENTS 11,653,002 B2 * 5/2023 Zhang .................. H04N 19/513
                                                    375/240.02
11,838,539 B2 * 12/2023 Liu ...................... H04N 19/537
(Continued)

FOREIGN PATENT DOCUMENTS

WO    WO 2020142448 A1    7/2020

OTHER PUBLICATIONS

Tencent Technology, ISRWO, PCT/US2023/066958, Sep. 27, 2023, 11 pgs.
(Continued)

*Primary Examiner* — Howard D Brown, Jr.
(74) *Attorney, Agent, or Firm* — Morgan, Lewis & Bockius LLP

(57) ABSTRACT

The various implementations described herein include methods and systems for decoding a current coding block. In one aspect, a method includes retrieving one or more motion vector (MV) candidates from a reference MV bank. The method includes, in accordance with a determination that a first condition is satisfied, inserting the one or more MV candidates from the reference MV bank into the MVP list associated with the current coding block after derived MV candidates is inserted into the MVP list. The method includes, in accordance with a determination that the first condition is not satisfied, inserting the one or more MV candidates from the reference MV bank into the MVP list associated with the current coding block before the derived (Continued)

MV candidates is inserted into the MVP list. The method includes predicting the current coding block based on the MVP list.

20 Claims, 11 Drawing Sheets

(51) Int. Cl.
  *H04N 19/132* (2014.01)
  *H04N 19/139* (2014.01)
  *H04N 19/159* (2014.01)
  *H04N 19/176* (2014.01)
  *H04N 19/186* (2014.01)
  *H04N 19/52* (2014.01)
  *H04N 19/573* (2014.01)
(52) U.S. Cl.
  CPC ......... *H04N 19/139* (2014.11); *H04N 19/159* (2014.11); *H04N 19/176* (2014.11); *H04N 19/186* (2014.11); *H04N 19/573* (2014.11)

(58) Field of Classification Search
  CPC .. H04N 19/176; H04N 19/186; H04N 19/573; H04N 19/88
  See application file for complete search history.

(56) References Cited

U.S. PATENT DOCUMENTS

| | | |
|---|---|---|
| 2017/0223350 A1* | 8/2017 | Xu .................... H04N 19/139 |
| 2020/0359049 A1 | 11/2020 | Zhao et al. |
| 2020/0366924 A1 | 11/2020 | Rusanovskyy et al. |
| 2020/0413045 A1 | 12/2020 | Zhang et al. |

OTHER PUBLICATIONS

Tencent America LLC, Japanese Office Action, JP Patent Application No. 2024-538352, Apr. 9, 2025, 14 pgs.

Yao-Jen Chang et al., "EE2-3.4, EE2-3.5, EE2-3.6: Experimental Results of the MV Candidates Reordering in Candidate Types Based on Template Matching Costs", Joint Video Experts Team (JVET) of ITU-T SG 16 WP 3 and ISO/IEC JTC 1/SC 29, Document: JVET-Y0134-v3, 25th Meeting, by teleconference, Jan. 12-21, 2022, 6 pgs.

* cited by examiner

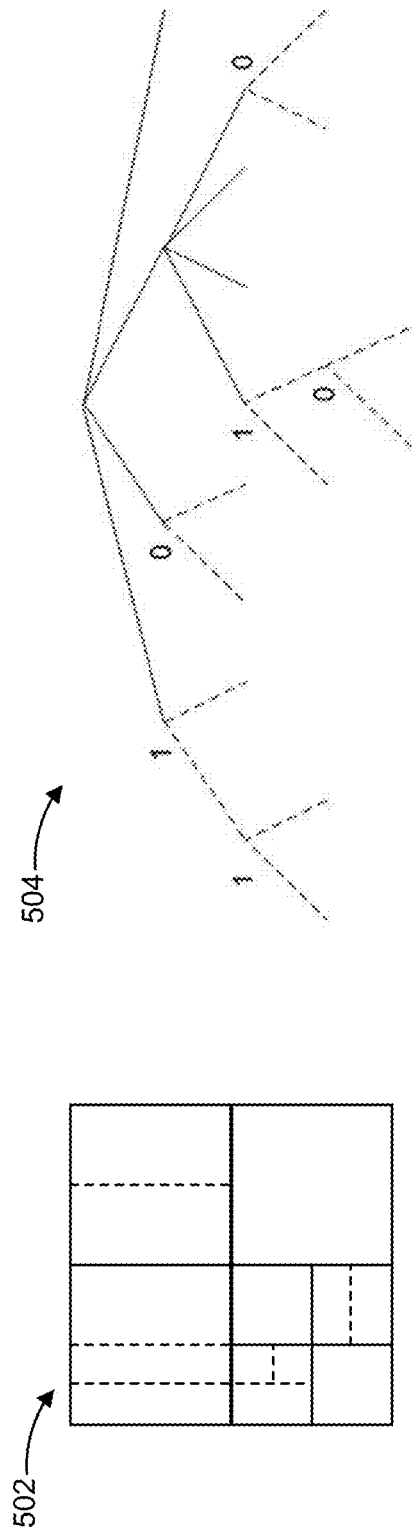
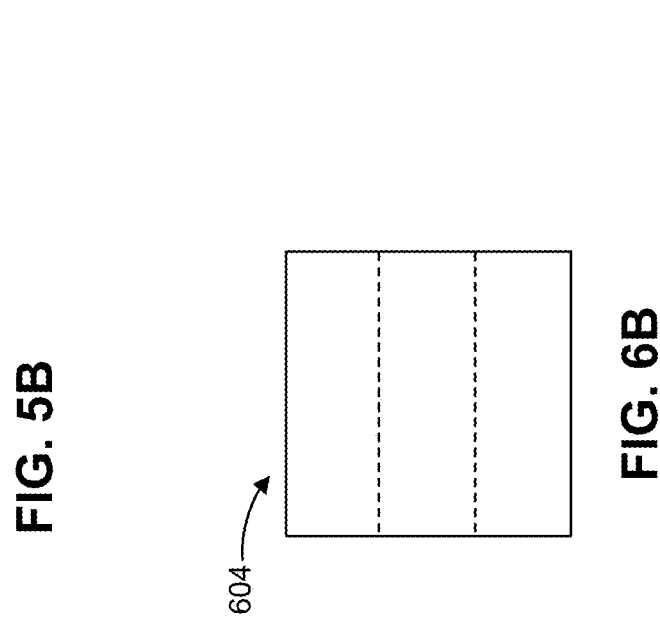
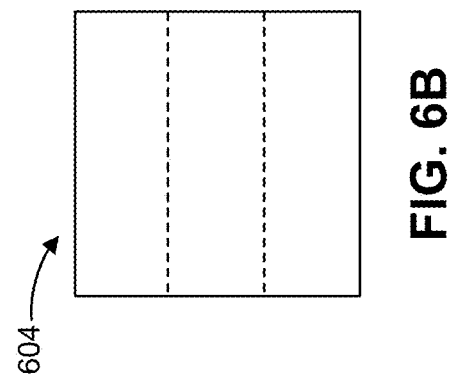
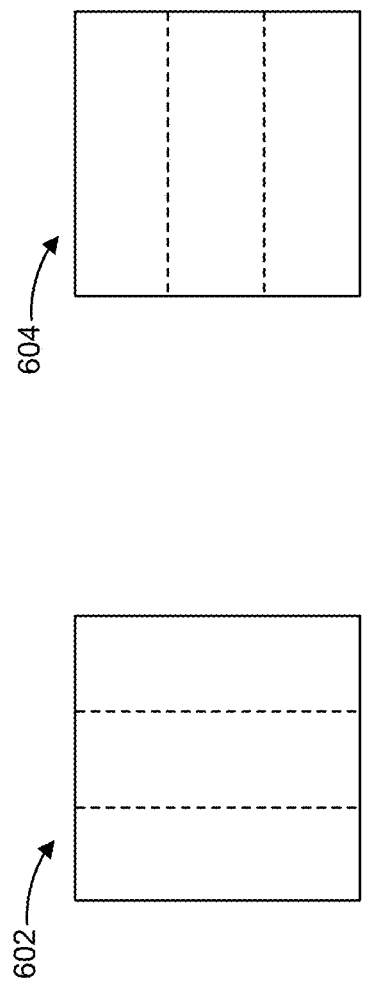
FIG. 5A
FIG. 5B
FIG. 6A
FIG. 6B

L0 reference

L1 reference

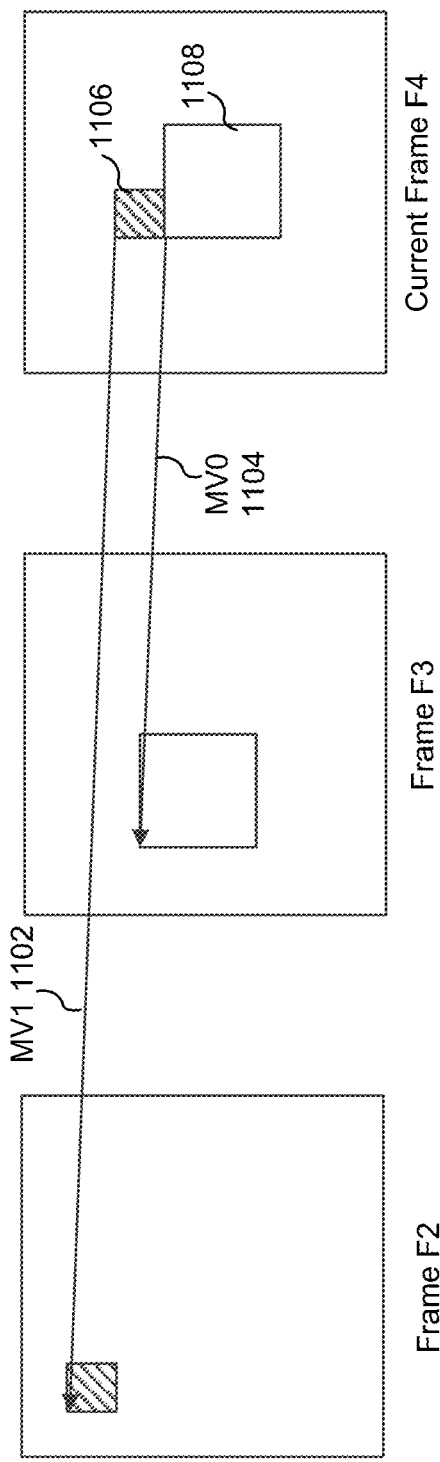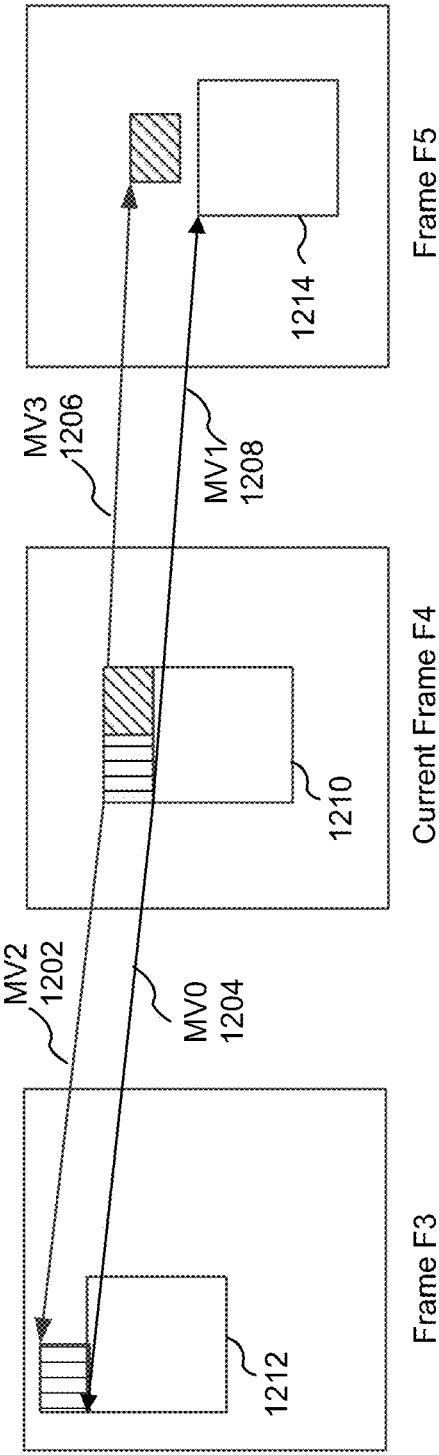
FIG. 11
FIG. 12

SYSTEMS AND METHODS FOR MOTION VECTOR PREDICTOR LIST IMPROVEMENTS

CROSS-REFERENCE TO RELATED APPLICATION

This application claims priority to U.S. Provisional Patent Application No. 63/349,754, entitled "Motion Vector Predictor List Improvements," filed Jun. 7, 2022, which is hereby incorporated by reference in its entirety.

TECHNICAL FIELD

The disclosed embodiments relate generally to video coding, including but not limited to systems and methods for motion vector predictor list improvements.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

The present disclosure describes improved methods and systems for decoding video data based on motion vector prediction (MVP) lists. In video codec standards, the result of motion vector prediction for a block being encoded or decoded is a list of motion vectors. The main idea in forming this list is that there is a high probability that the motion vector for a current block has very little difference from the motion vectors for the adjacent blocks coded earlier, which can thus be used as a prediction. Presently, the process of ordering motion vector (MV) candidates in MVP lists is sub-optimal because some MV candidates that are more important (e.g., yield more accurate predictions) are put into the lists with a later position. Furthermore, a pre-defined weighting-based re-ordering process is used to re-order only the adjacent spatial MVP (SMVP), temporal MVP (TMVP), and non-adjacent SMVP, which is suboptimal for other MV candidates.

Accordingly, there is a need for improved methods and systems for constructing MVP lists for encoding and decoding video data. For example, as spatial MV candidates are usually more accurate than combined (e.g., scaled) candidates and padded candidates (such as zero MV), according to some aspects of the present disclosure, candidates from a reference MV candidate bank are inserted into the MVP list, prior to other MV candidates, when one or more conditions are satisfied. Because the MV candidates from the reference MV candidate bank are mainly from spatial neighbors, the present disclosure generates an improved MVP list with more accurate motion vector prediction, thereby resulting in increased coding efficiency.

In accordance with some embodiments, a method for constructing decoding a current coding block is performed at a computing system having one or more processors and memory. The method includes retrieving one or more motion vector (MV) candidates from a reference MV bank. The method includes, in accordance with a determination that a first condition is satisfied, inserting the one or more MV candidates from the reference MV bank into a motion vector prediction (MVP) list associated with the current coding block after derived MV candidates are inserted into the MVP list. The method includes, in accordance with a determination that the first condition is not satisfied, inserting the one or more MV candidates from the reference MV bank into the MVP list associated with the current coding block before the derived MV candidates are inserted into the MVP list. The method includes predicting the current coding block based on the MVP list.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIGS. 5A and 5B illustrate a quad-tree (QT) plus binary tree (QTBT) structure, in accordance with some embodiments.

FIGS. 6A and 6B illustrate triple-tree (TT) partitioning, in accordance with some embodiments.

FIG. 7 illustrates examples of search points for merge modes with motion vector difference (MMVD), in accordance with some embodiments.

FIG. 8 illustrates using spatial neighboring blocks for MV prediction, in accordance with some embodiments.

FIG. 11 illustrates additional motion vector candidate generation for a single inter prediction block, in accordance with some embodiments.

FIG. 12 illustrates additional motion vector candidate generation for a compound prediction block, in accordance with some embodiments.

In accordance with common practice, the various features illustrated in the drawings are not necessarily drawn to scale, and like reference numerals can be used to denote like features throughout the specification and figures.

DETAILED DESCRIPTION

The present disclosure describes decoding a current coding block based on motion vector prediction (MVP) lists. One or more motion vector (MV) candidates are retrieved from a reference MV bank. When a first condition is satisfied, the MV candidates are inserted from the reference MV bank into the MVP list associated with the current coding block after derived MV candidates are inserted into the MVP list. When the first condition is not satisfied, the MV candidates are inserted from the reference MV bank into the MVP list associated with the current coding block before the derived MV candidates are inserted into the MVP list. The current coding block is predicted based on the MVP list. Derived MV candidates are MV predictors derived from either motion vector(s) in a single reference frame based on inter prediction or composed motion vector(s) from a plurality of neighboring reference frames in a compound inter prediction mode.

Example Systems and Devices

Figure 1:
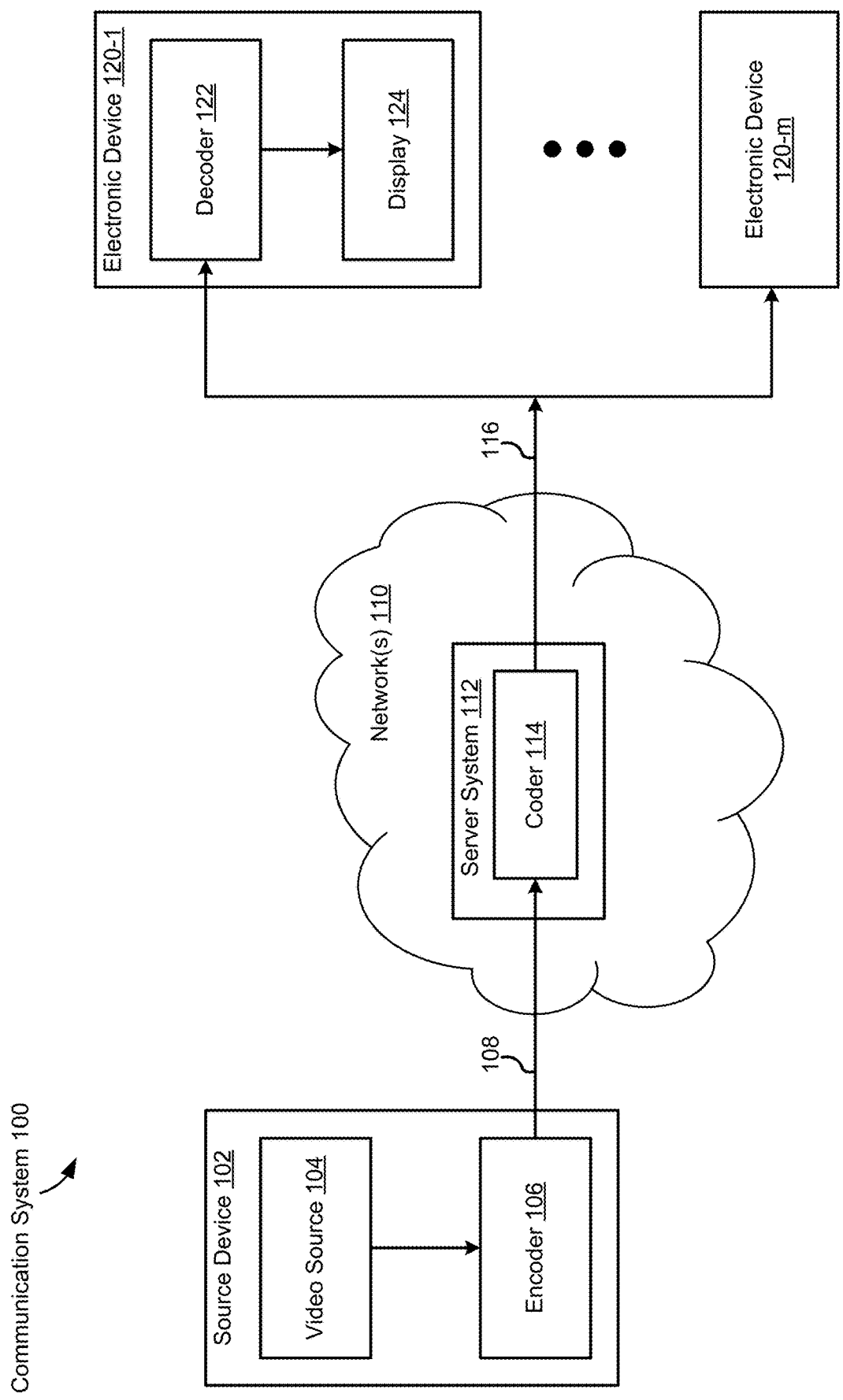
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
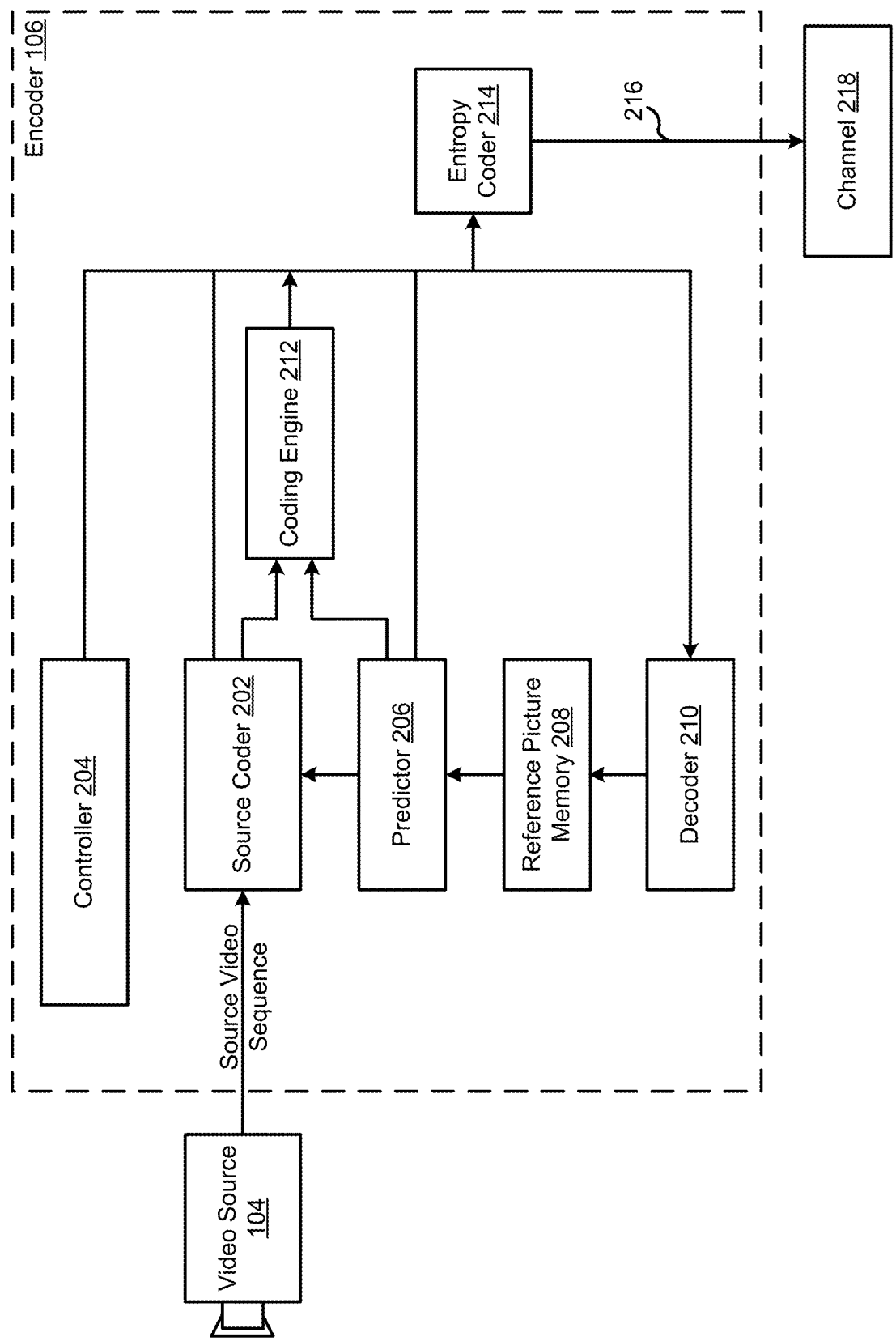
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture (s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
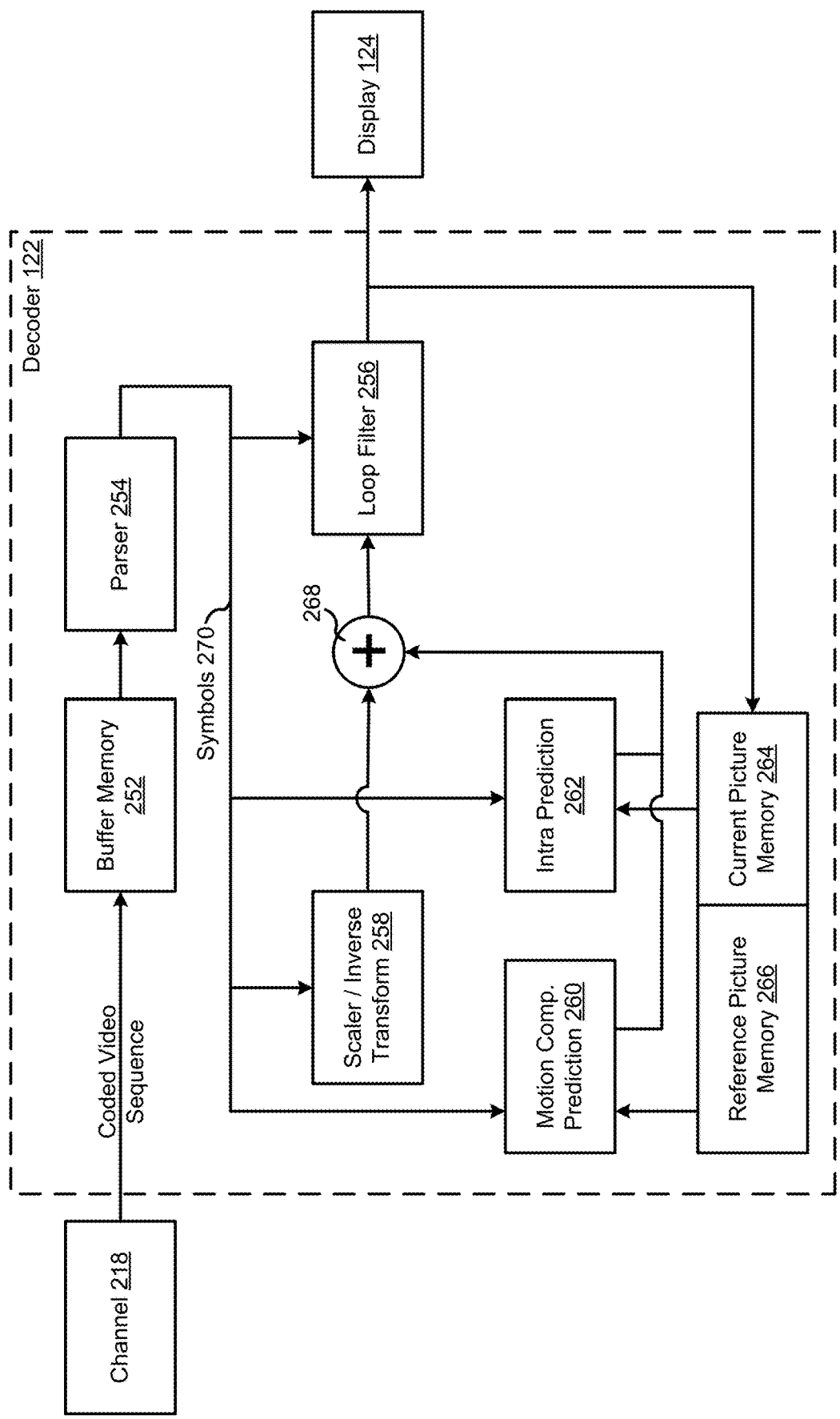
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (JIRD) specifications and metadata for HRD buffer management signaled in the coded video sequence.

Figure 3:
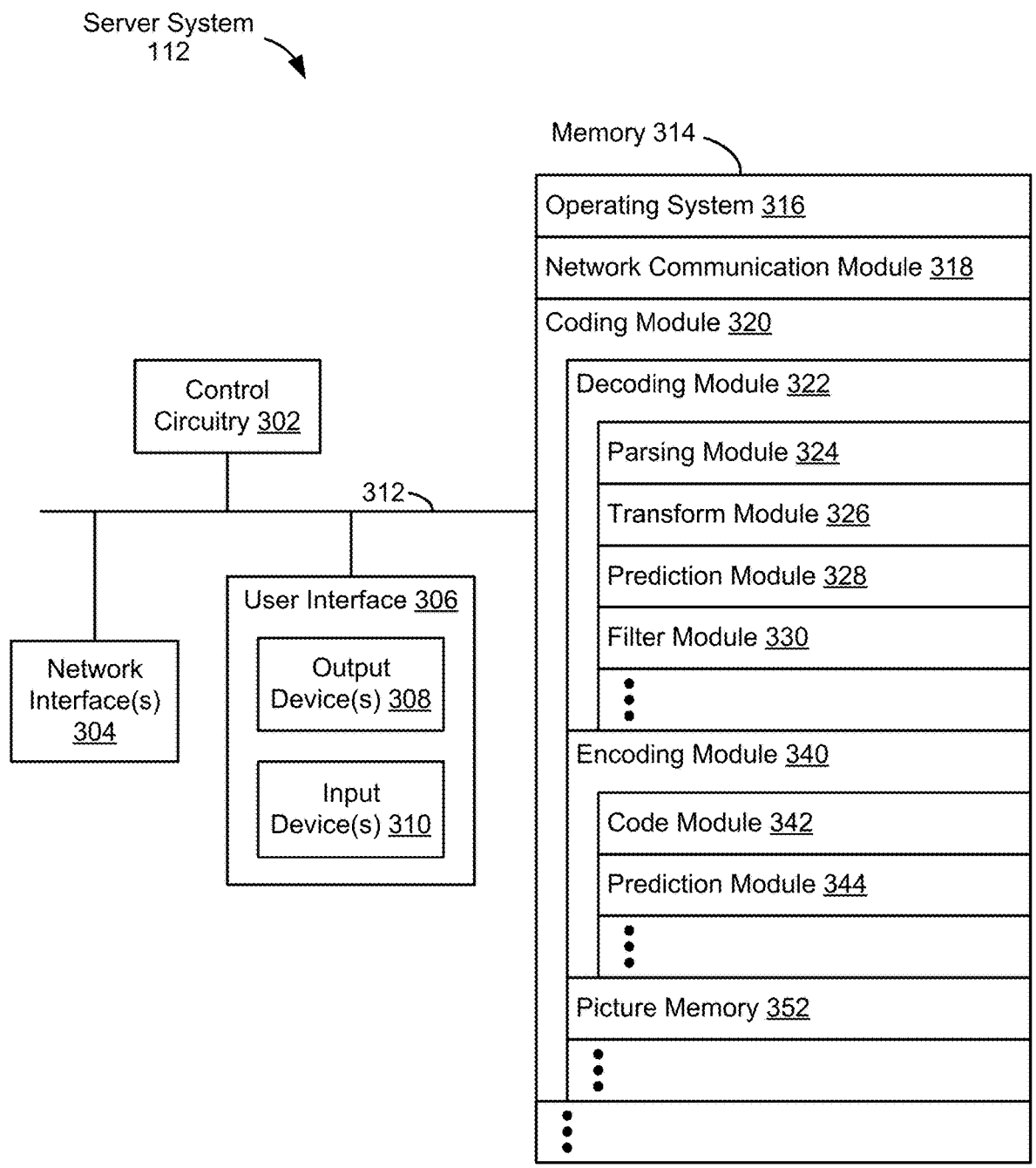
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Block Partitioning

Figure 4:
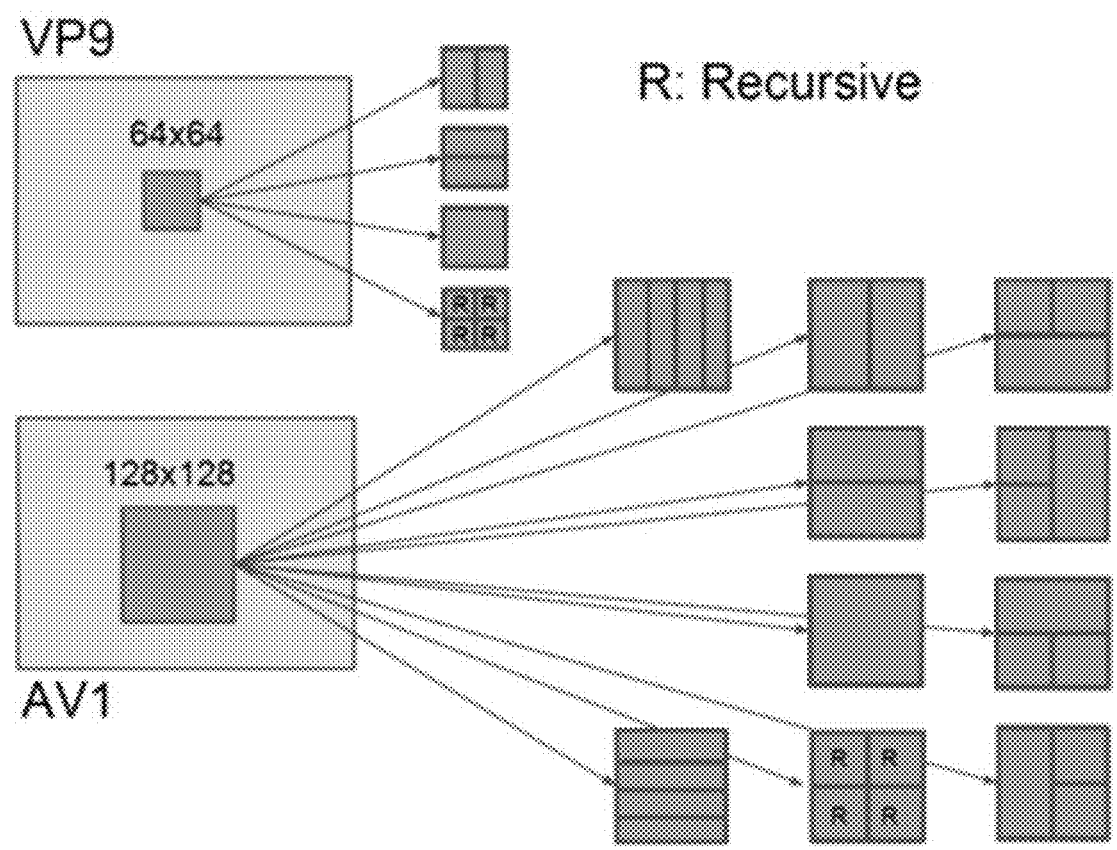
FIG. 4 illustrates block partitioning in accordance with some embodiments.

FIG. 4 illustrates block partitioning according to some embodiments. The top half of FIG. 4 illustrates block partitioning in VP9, which uses a 4-way partition tree starting from the 64×64 level down to 4×4 level, with some additional restrictions for blocks 8×8 and below. Partitions designated as "R" refer to as recursive in that the same partition tree is repeated at a lower scale until the lowest 4×4 level is reached. The bottom half of FIG. 4 illustrates block partitioning for AV1, which not only expands the partition-tree to a 10-way structure, but also increases the largest size (referred to as superblock in VP9/AV1 parlance) to start from 128×128. The 10-way structure includes 4:1/1:4 rectangular partitions and none of the rectangular partitions can be further subdivided. AV1 adds more flexibility to the use of partitions below 8×8 level. For example, 2×2 chroma inter prediction is possible in certain cases.

In some embodiments, block portioning involves splitting a coding tree unit (CTU) into coding units (CUs) by using a quadtree structure denoted as coding tree to adapt to various local characteristics. The decision on whether to code a picture area using inter-picture (temporal) or intra-picture (spatial) prediction is made at the CU level. Each CU can be further split into one, two or four prediction units (PUs) according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure like the coding tree for the CU. In some embodiments, a block is partitioned using multiple partition conceptions including CU, PU, and TU. In some embodiments, a CU or a TU can only be square shape, while a PU may be square or rectangular shape for an inter predicted block. In some embodiments, one coding block may be further split into four square sub-blocks, and transform is performed on each sub-block, i.e., TU. Each TU can be further split recursively (using quadtree split) into smaller TUs, which is called Residual Quad-Tree (RQT).

In some embodiments, block partitioning comprises using quad-tree (QT) plus binary tree (BT) structure (also known as QTBT structure). The QTBT structure removes the concepts of multiple partition types, i.e., QTBT removes the separation of the CU, PU and TU concepts, and supports more flexibility for CU partition shapes. In the QTBT block structure, a CU can have either a square or rectangular shape. This is illustrated in FIG. 5A. A coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In some embodiments, a CU includes coding blocks (CBs) of different colour components. For example, one CU contains one luma CB and two chroma CBs in the case of P and B slices of the 4:2:0 chroma format and sometimes consists of a CB of a single component. As another example, one CU contains only one luma CB or two chroma CBs in the case of I slices.

In some embodiments, the following parameters are defined for the QTBT partitioning scheme: (i) CTU size: the root node size of a quadtree (e.g., the same concept as in HEVC); (ii) MinQTSize: the minimum allowed quadtree leaf node size; (iii) MaxBTSize: the maximum allowed binary tree root node size; (iv) MaxBTDepth: the maximum allowed binary tree depth; and (v) MinBTSize: the minimum allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (the MinQTSize) to 128×128 (the CTU size). If the leaf quadtree node is 128×128, it will not be further split by the binary tree since the size exceeds the MaxBTSize (64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (4), no further splitting is considered. When the binary tree node has width equal to MinBTSize (4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

FIG. 5A shows an example of partitioning of a block 502 using QTBT. FIG. illustrates the corresponding tree representation 504. The solid lines indicate quadtree splitting and dotted lines indicate binary tree splitting. In each splitting (e.g., non-leaf) node of the binary tree, one flag is signalled to indicate which splitting type (e.g., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In some embodiments, the QTBT scheme supports the flexibility for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In some embodiments, inter prediction for small blocks is restricted to reduce the memory access of motion compensation, such that bi-directional prediction is not supported for 4×8 and 8×4 blocks, and inter prediction is not supported for 4×4 blocks. In some embodiments, these restrictions are removed in QTBT.

In some embodiments, block partitioning is implemented using triple trees (TT) (also known as multi-type-tree (MTT) structures). FIGS. 6A and 6B illustrates MTT structures 602 and 602 according to some embodiments. The MTT structures add the horizontal and vertical center-side triple-trees on top of QTBT. The benefits of the triple-tree partitioning include: (i) complementarity to quad-tree and binary-tree partitioning: triple-tree partitioning captures objects locates in a block center while quad-tree and binary-tree are always splitting along block center; and (ii) the width and height of the partitions of the proposed triple trees are always power of 2 so that no additional transforms are needed.

The design of two-level tree is mainly motivated by complexity reduction. Theoretically, the complexity of traversing of a tree is $T^D$, where T denotes the number of split types, and D is the depth of tree.

Merge Mode with Motion Vector Difference (MMVD)

In merge mode, the implicitly derived motion information is directly used for prediction samples generation of the current CU. In the merge mode with motion vector differences (MMVD), MMVD flag may be signaled right after sending a skip flag and merge flag to specify whether MMVD mode is used for a CU.

In MMVD, after a merge candidate is selected, it can be further refined by signaled motion vector difference(s) (MVDs) information. The signaled information may include a merge candidate flag, an index to specify motion magnitude, and an index for indication of motion direction. In MMVD mode, one for the first two candidates in the merge list is selected to be used as MV basis. The merge candidate flag may be signalled to specify which one is used.

Figures 7, 8:
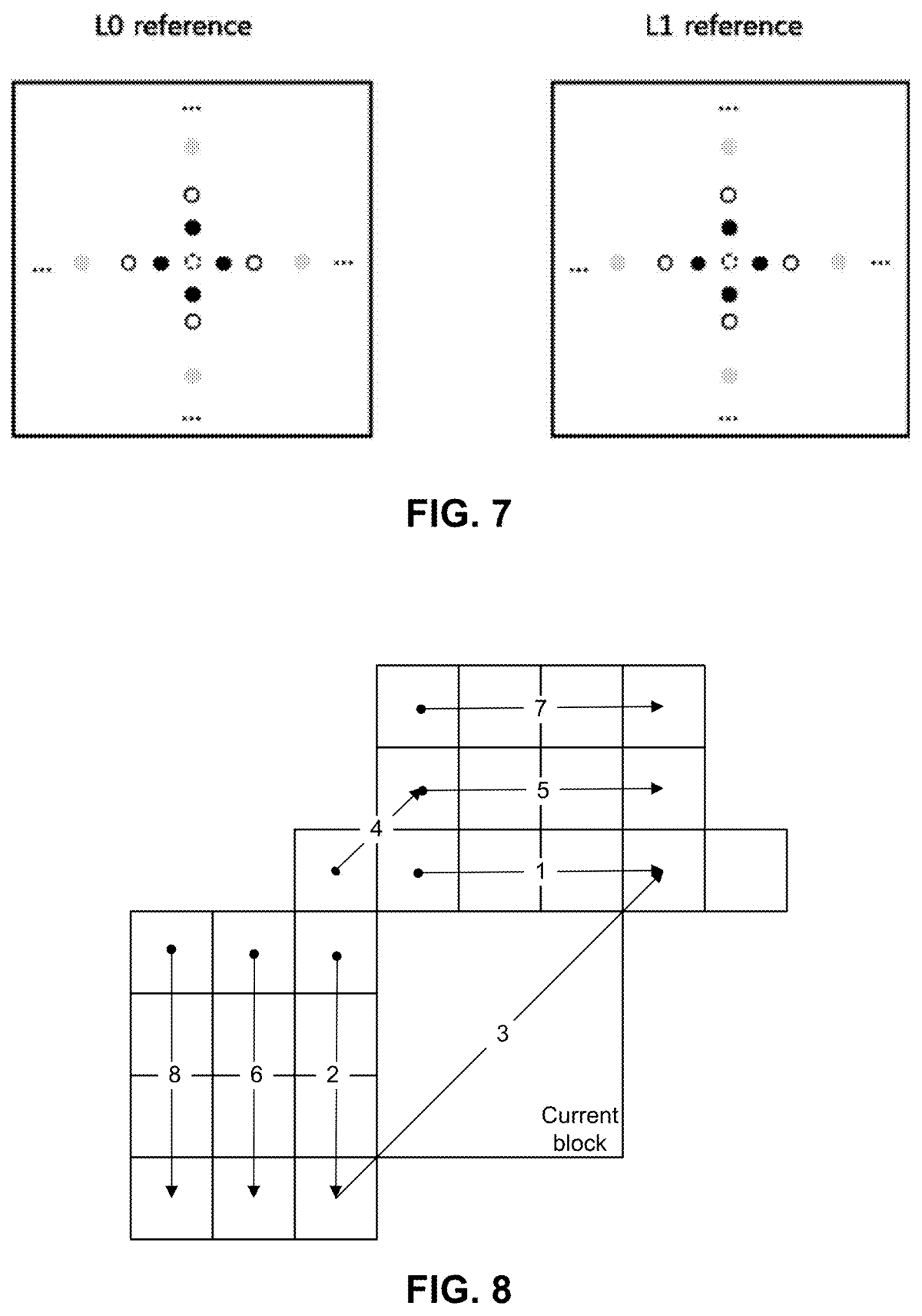

Distance index specifies motion magnitude information and indicates the pre-defined offset from the starting point. As shown in FIG. 7, an offset may be added to either horizontal component or vertical component of starting motion vector (MV). The relation of distance index and pre-defined offset may be specified in Table 1.

TABLE 1

The relation of distance index and pre-defined offset

| Distance index (IDX) | 0 | 1 | 2 | 3 | 4 | 5 | 6 | 7 |
|---|---|---|---|---|---|---|---|---|
| Offset (in units of luma sample) | ¼ | ½ | 1 | 2 | 4 | 8 | 16 | 32 |

Direction index represents the direction of the MVD relative to the starting point. The direction index can represent four directions, as shown in Table 2.

TABLE 2

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

In some embodiments, the meaning of MVD sign can vary according to the information of starting MVs. When the starting MVs is a uni-directional prediction MV or bi-directional prediction MVs with both lists pointing to the same side of the current picture (e.g., the picture order count (POCs) of two references are both larger than the POC of the current picture, or are both smaller than the POC of the current picture), the sign in Table 2 specifies the sign of MV offset added to the starting MV. When the starting MVs is bi-directional prediction MVs with the two MVs pointing to the different sides of the current picture (e.g., the POC of one reference is larger than the POC of the current picture, and the POC of the other reference is smaller than the POC of the current picture), and the difference of POC in list 0 is greater than the one in list 1, the sign in Table 2 specifies the sign of MV offset added to the list0 MV component of starting MV and the sign for the list1 MV has opposite value.

Otherwise, if the difference of POC in list 1 is greater than list 0, the sign in Table 2 specifies the sign of MV offset added to the list1 MV component of starting MV and the sign for the list0 MV has opposite value.

In some embodiments, the MVD is scaled according to the difference of POCs in each direction. If the differences of POCs in both lists are the same, no scaling is needed. Otherwise, if the difference of POC in list 0 is larger than the one of list 1, the MVD for list 1 is scaled. If the POC difference of L1 is greater than L0, the MVD for list 0 is scaled in the same way. If the starting MV is uni-predicted, the MVD is added to the available MV.

Symmetric Motion Vector Difference (MVD) Coding

In symmetric MVD mode, motion information including reference picture indices of both list-0 and list-1 and MVD of list-1 are not signaled but derived.

In some embodiments, the decoding process of the symmetric MVD mode at the slice level is as follows: Variables BiDirPredFlag, RefIdxSymL0 and RefIdxSymL1 are derived as follows: (i) If mvd_l1_zero_flag is 1, BiDirPredFlag is set equal to 0. (ii) Otherwise, if the nearest reference picture in list-0 and the nearest reference picture in list-1 form a forward and backward pair of reference pictures or a backward and forward pair of reference pictures, BiDirPredFlag is set to 1, and both list-0 and list-1 reference pictures are short-term reference pictures. (iii) Otherwise BiDirPredFlag is set to 0.

In some embodiments, the decoding process of the symmetric MVD mode at CU level is as follows: a symmetrical mode flag indicating whether symmetrical mode is used or not is explicitly signaled if the CU is bi-directional prediction coded and BiDirPredFlag is equal to 1. When the symmetrical mode flag is true, only mvp_l0_flag, mvp_l1_flag and MVD0 are explicitly signaled. The reference indices for list-0 and list-1 are set equal to the pair of reference pictures, respectively. MVD1 is set equal to (−MVD0).

Inter Mode Coding

In some embodiments, for a coded block in an inter frame, if the mode of current block is not skip mode but an inter-coded mode, another flag is signaled to indicate whether single reference mode or compound reference mode is used for a current block. In single reference mode, the prediction block is generated by one motion vector. In compound reference mode (e.g., a current block has two reference pictures), the prediction block is generated by weighted averaging two prediction blocks derived from two motion vectors.

In some embodiments, the following modes are signaled in single reference mode:
  NEARMV—use one of the motion vector predictors (MVP) in the list indicated by a DRL (Dynamic Reference List) index
  NEWMV—use one of the motion vector predictors (MVP) in the list signaled by a DRL index as reference and apply a delta to the MVP.
  GLOBALMV—use a motion vector based on frame-level global motion parameters In some embodiments, the following modes are signaled for compound reference modes:
  NEAR_NEARMV—use one of the motion vector predictors (MVP) in the list signaled by a DRL index.
  NEAR_NEWMV—use one of the motion vector predictors (MVP) in the list signaled by a DRL index as reference and send a delta MV for the second MV.
  NEW_NEARMV—use one of the motion vector predictors (MVP) in the list signaled by a DRL index as reference and send a delta MV for the first MV.
  NEW_NEWMV—use one of the motion vector predictors (MVP) in the list signaled by a DRL index as reference and send a delta MV for both MVs.
  GLOBAL_GLOBALMV—use MVs from each reference based on their frame-level global motion parameters Motion Vector Difference (MVD) Coding AV1 allows ⅛ pixel motion vector precision (or accuracy). The following syntaxes are used to signal the motion vector difference in reference frame list 0 or list 1.
  mv_joint specifies which components of the motion vector difference are non-zero
    0 indicates there is no non-zero MVD along either horizontal or vertical direction
    1 indicates there is non-zero MVD only along horizontal direction
    2 indicates there is non-zero MVD only along vertical direction
    3 indicates there is non-zero MVD along both horizontal and vertical direction
  mv_sign specifies whether motion vector difference is positive or negative
  mv_class specifies the class of the motion vector difference. As shown in Table 3, a higher class means that the motion vector difference has a larger magnitude
  mv_bit specifies the integer part of the offset between motion vector difference and starting magnitude of each MV class
  mv_fr specifies the first 2 fractional bits of the motion vector difference
  mv_hp specifies the third fractional bit of the motion vector difference

TABLE 3

Magnitude class for motion vector difference

| MV class | Magnitude of MVD |
| --- | --- |
| MV_CLASS_0 | (0, 2] |
| MV_CLASS_1 | (2, 4] |
| MV_CLASS_2 | (4, 8] |
| MV_CLASS_3 | (8, 16] |
| MV_CLASS_4 | (16, 32] |
| MV_CLASS_5 | (32, 64] |
| MV_CLASS_6 | (64, 128] |
| MV_CLASS_7 | (128, 256] |
| MV_CLASS_8 | (256, 512] |
| MV_CLASS_9 | (512, 1024] |
| MV_CLASS_10 | (1024, 2048] |

Adaptive MVD Resolution

For NEW_NEARMV and NEAR_NEWMV mode, the precision of the MVD depends on the associated class and the magnitude of MVD. For example, fractional MVD is allowed only if MVD magnitude is equal to or less than one-pixel. As another example, only one MVD value is allowed when the value of the associated MV class is equal to or greater than MV_CLASS_1, and the MVD value in each MV class is derived as 4, 8, 16, 32, 64 for MV class 1 (MV_CLASS_1), 2 (MV_CLASS_2), 3 (MV_CLASS_3), 4 (MV_CLASS_4), or 5 (MV_CLASS_5). As another example, if a current block is coded as NEW_NEARMV or NEAR_NEWMV mode, one context is used for signaling mv_joint or mv_class. Otherwise (e.g., the current block is not coded as NEW_NearMV), another context is used for signaling mv_joint or mv_class.

Table 4 illustrates the allowed MVD values for respective MV classes.

TABLE 4

Adaptive MVD in each MV magnitude class

| MV class | Magnitude of MVD |
|---|---|
| MV_CLASS_0 | (0, 1], {2} |
| MV_CLASS_1 | {4} |
| MV_CLASS_2 | {8} |
| MV_CLASS_3 | {16} |
| MV_CLASS_4 | {32} |
| MV_CLASS_5 | {64} |
| MV_CLASS_6 | {128} |
| MV_CLASS_7 | {256} |
| MV_CLASS_8 | {512} |
| MV_CLASS_9 | {1024} |
| MV_CLASS_10 | {2048} |

In some embodiments, an inter-coded mode, named JOINT_NEWMV, is applied to indicate whether the MVDs for two reference lists are jointly signaled. If the inter prediction mode is equal to JOINT_NEWMV mode, MVDs for reference list 0 and reference list 1 are jointly signaled. So, only one MVD, named as joint_mvd, is signaled and transmitted to the decoder, and the delta MVs for reference list 0 and reference list 1 are derived from joint_mvd.

In some embodiments, JOINT_NEWMV mode is signaled together with NEAR_NEARMV, NEAR_NEWMV, NEW_NEARMV, NEW_NEWMV, and GLOBAL_GLOBALMV mode. No additional contexts are added.

In some embodiments, When JOINT_NEWMV mode is signaled, and the POC distance between two reference frames and current frame is different, MVD is scaled for reference list 0 or reference list 1 based on the POC distance. The distance between reference frame list 0 and current frame is noted as td0 and the distance between reference frame list 1 and current frame is noted as td1. If td0 is equal to or larger than td1, joint_mvd is directly used for reference list 0 and the mvd for reference list 1 is derived from joint_mvd based on the equation (1).

$$derived\_mvd = \frac{td1}{td0} * joint\_mvd \quad (1)$$

Otherwise, if td1 equal to or larger than td0, joint_mvd is directly used for reference list 1 and the mvd for reference list 0 is derived from joint_mvd based on the equation (2).

$$derived\_mvd = \frac{td0}{td1} * joint\_mvd \quad (2)$$

In some embodiments, an inter-coded mode, termed AMVDMV, is added to single reference case. When AMVDMV mode is selected, it indicates that AMVD is applied to signal MVD. A flag (amvd_flag) is added under JOINT_NEWMV mode to indicate whether AMVD is applied to joint MVD coding mode. When adaptive MVD resolution is applied to joint MVD coding mode, named as joint AMVD coding, MVD for two reference frames are jointly signaled and the precision of MVD is implicitly determined by MVD magnitudes. Otherwise, MVD for two (or more than two) reference frames are jointly signaled, and conventional MVD coding is applied.

In some embodiments, adaptive motion vector resolution (AMVR) supports 7 MV precisions (8, 4, 2, 1, ½, ¼, ⅛). For each prediction block, an AOM video model (AVM) encoder searches all the supported precision values and signals the best precision to the decoder. In some embodiments, to reduce the encoder run-time, two precision sets are supported. Each precision set contains 4-predefined precisions. The precision set is adaptively selected at the frame level based on the value of maximum precision of the frame. In some embodiments, the maximum precision is signaled in the frame header.

Table 5 summarizes the supported precision values based on the frame level maximum precision.

TABLE 5

Supported MV precisions in two sets

| Frame level maximum precision | Supported MV precisions |
|---|---|
| ⅛ | ⅛, ½, 1, 4 |
| ¼ | ¼, 1, 4, 8 |

In some embodiments, a frame level flag indicates whether the MVs of the frame contains sub-pel precisions or not. The AMVR is enabled only if the value of cur_frame_force_integer_mv flag is 0. In the AMVR, if precision of the block is lower than the maximum precision, motion model and interpolation filters are not signaled. If the precision of a block is lower than the maximum precision, motion mode is inferred to translation motion and interpolation filter is inferred to REGULAR interpolation filter. Similarly, if the precision of the block is either 4-pel or 8-pel, inter-intra mode is not signaled and inferred to be 0.

Motion Vector Predictor (MVP) List

The spatial motion vector predictor (SMVP) (e.g., both adjacent and non-adjacent SMVP), temporal MV predictor (TMVP), extra MV candidate in AV1, and additionally derived MVP, and reference bank MVP are additional added in the AVM design. A stack with fixed size is generated both at the encoder and decoder ends to store the MVP list.

In some embodiments, SMVPs are derived from spatial neighboring blocks. Spatial neighboring blocks include adjacent spatial neighboring blocks, which are direct neighbors of the current block to the top and left sides, as well as non-adjacent spatial neighboring blocks, which are not directly adjacent to the current block. An exemplary set of spatial neighboring blocks for a luma block is illustrated in FIG. 8, wherein each spatial neighboring block is an 8×8 block. The spatial neighboring blocks are examined to find one or more MVs that are associated with the same reference frame index as the current block. For the current block, the search order of spatial neighboring 8×8 luma blocks is as indicated by the numbers 1-8 in FIG. 8:

1. The top adjacent row is checked from left to right.
2. The left adjacent column is checked from top to bottom.
3. The top-right neighboring block is checked.
4. The top-left block neighboring block is checked.
5. The first top non-adjacent row is checked from left to right.
6. The first left non-adjacent column is checked from top to bottom.
7. The second top non-adjacent row is checked from left to right.
8. The second left non-adjacent column is checked from top to bottom.

In some embodiments, the adjacent candidates (candidates 1-3 in FIG. 8) are inserted into the MV predictor list before TMVP, the non-adjacent (also known as outer candidates, i.e., candidates 4-8 in FIG. 8) are put into the MV predictor list after TMVP. All the SMVP candidates should have the same reference picture as the current block. If the current block has single reference picture, the MVP candidate with single reference picture and this reference picture is same as the reference picture of the current block, or with compound reference pictures (e.g., two reference pictures) and one of the reference pictures is same as the reference picture of the current block, this MVP candidate will be put into the MV predictor list. If the current block has two reference pictures, an MVP candidate will be put into the MV predictor list only when the MVP candidate has two reference pictures and these two reference pictures are the same as the reference pictures of the current block.

In some embodiments, the outer candidates represented by lines 5 and 7 in FIG. 8 are further removed from the non-adjacent candidates to reduce the line memory.

In some embodiments, TMVPs can be derived using collocated blocks in reference frames. To generate TMVPs, the MVs of reference frames are first stored with reference indices associated with the respective reference frames. Thereafter, for each 8×8 block of the current frame, the MVs of a reference frame whose trajectories pass through the 8×8 block are identified and stored with the reference frame index in a temporal MV buffer. For inter prediction using a single reference frame, regardless of whether the reference frame is a forward or backward reference frame, the MVs are stored in 8×8 units for performing the temporal motion vector prediction of a future frame. For compound inter prediction, only the forward MVs are stored in 8×8 units for performing the temporal motion vector prediction of a future frame.

Figure 9:
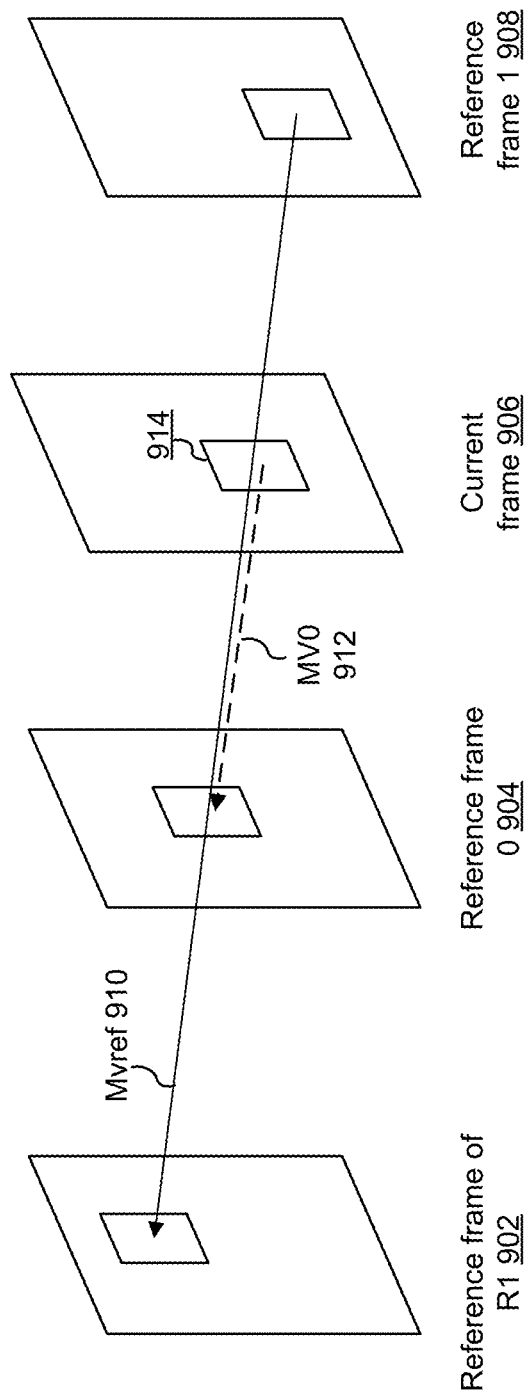
FIG. 9 illustrates motion field estimation by linear projection, in accordance with some embodiments.
Figure 10:
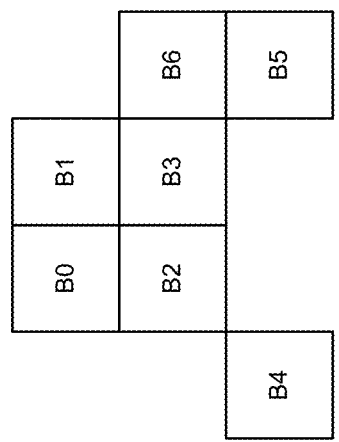
FIG. 10 illustrates the use of block positions for deriving temporal MV predictors, in accordance with some embodiments.

FIG. 9 shows a motion vector MVref 910, corresponding to reference frame 1 (R1) 908, pointing from R1 to a reference frame of R1 902. In doing so, MVref 910 passes through an 8×8 block 914 of a current frame 906. MVref 910 is stored in a temporal MV buffer associated with the 8×8 block 914. During the motion projection process for deriving the TMVP, the reference frames are scanned in a predefined order: LAST_FRAME, BWDREF_FRAME, ALTREF_FRAME, ALTREF2_FRAME, and LAST2_FRAME. The MVs from a higher indexed reference frame (in scanning order) does not replace the previously identified MVs assigned by a lower indexed reference frame (in scanning order). Given predefined block coordinates, the associated MVs stored in the temporal MV buffer are identified and projected on to the current block to derive a temporal MV predictor (e.g., MV0 912) that points from the current block 914 to its reference frame 904, FIG. 10 shows pre-defined block positions for deriving temporal MV predictors of a 16×16 block, in accordance with some embodiments. Up to seven blocks (e.g., blocks B0 to B6) are checked for valid temporal MV predictors. The temporal MV predictors are checked after the adjacent spatial MV predictors but before the non-adjacent spatial MV predictors.

To derive the MV predictors, all the spatial and temporal MV candidates are pooled, and each predictor is assigned a weight that is determined during the scanning of the spatial and temporal neighboring blocks. Based on the associated weights, the candidates are sorted and ranked, and up to four candidates are identified and added to an MV predictor list. This list of MV predictors is also referred to as a dynamic reference list (DRL), which is further used in dynamic MV prediction modes, as described in the next subsection.

Extra search for extra MVP candidates. In some embodiments, if the MVP list is still not full, and extra search will be performed and the extra MVP candidates will use to fill the MVP list. The extra MVP candidates includes, for example, global MV, zero MV, and combined compound MVs without scaling.

MVP candidate reordering process. In some embodiments, the adjacent SMVP candidates, TMVP candidates non-adjacent SMVP candidates that are added in the MVP list will be reordered. In some embodiments, the reordering process is based on a weight of each candidate. The weight of a candidate is predefined depending on the overlapped area of the current block and the candidate blocks. In some embodiments, the weighting of outer/non-adjacent and TMVP candidates are not considered during the reordering process, which means the reordering process is only affect the adjacent candidates.

Derived MVP candidates. In some embodiments, derived MVP candidates include both derived MVP for single reference picture and compound mode.

Single inter prediction. In some embodiments, if the reference frame of a neighboring block is different from the reference frame of the current block but in the same direction, a temporal scaling algorithm can be utilized to scale its MV to that reference frame in order to form a MVP for the motion vector of current block. FIG. 11 shows an example where MV1 1102 from neighboring block 1106 can be utilized to derive the MVP for the motion vector, MV0 1104, of current block 1108 with temporal scaling.

Compound inter prediction. In some embodiments, the composed MVs from different neighboring blocks are exploited to derive a MVP of a current block, but the reference frames of the composed MVs need to be the same as current block. As shown in FIG. 12, the composed MV, composing of MV2 1202 and MV3 1206, have the same reference frames as current block 1210, but they are from different neighboring blocks. FIG. 12 shows motion vector MV0 1204 of the current block 1210 in the current frame F4 pointing to another reference block 1212 in frame F3, and motion vector MV1 1208 of the current block 1210 pointing (e.g., in another direction) to another reference block 1214 in frame F3.

Figure 13:
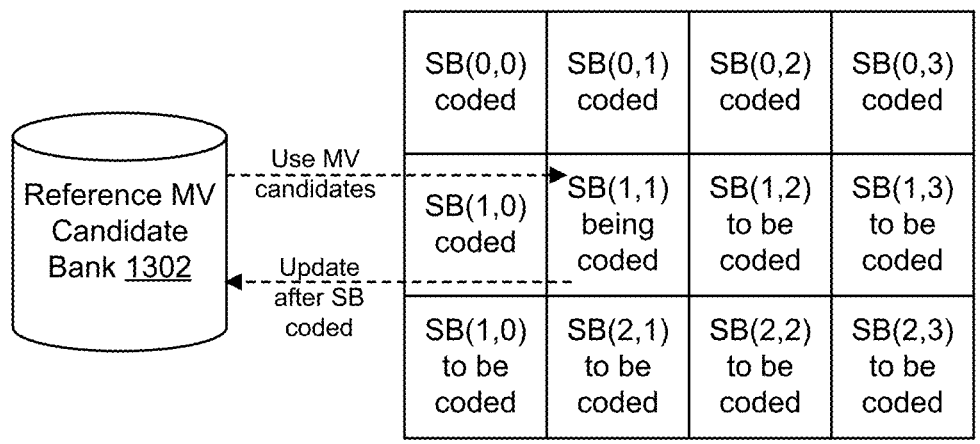
FIG. 13 illustrates a reference MV candidate bank updating process, in accordance with some embodiments.

FIG. 13 illustrates a reference MV candidate bank 1302 that can be part of, or communicatively connected with, a computing system (e.g., the server system 112, the source device 102, or the electronic device 120) in accordance with some embodiments. In some embodiments, each buffer corresponds to a unique reference frame type, corresponding to a single or a pair of reference frames, covering single and compound inter modes respectively. In some embodiments, all the buffers are the same size. In some embodiments, when a new MV is added to a buffer that is full, an existing MV is evicted to make room for the new one.

Coding blocks can refer to the MV candidate bank to collect reference MV candidates, in addition to the ones obtained with the reference MV list generation. After coding a superblock, the MV candidate bank 1302 is updated with the MVs used by the coding blocks of the superblock.

In some embodiments, each tile has an independent MV reference bank that is utilized by all superblocks within the tile. At the beginning of encoding each tile, the corresponding bank is emptied. Thereafter, while coding each superblock within that tile, MVs from the bank may be used as MV reference candidates. At the end of encoding a superblock, the bank is updated.

FIG. 13 shows an updating process for the reference MV candidate bank 1302 based on superblock in accordance with some embodiments. After a superblock is coded, the first e.g., (up to 64) candidate MVs used by each coding block inside the superblock are added to the reference MV candidate bank 1302. In some embodiments, a pruning process is also involved during the updating. In some embodiments, after scanning for reference MV candidates, if there are open slots in the candidate list, the codec algorithm can reference the MV candidate bank 1302 (in the buffer with matching reference frame type) for additional MV candidates. Starting from the end to the start of the buffer, the MV in the bank buffer is appended to the candidate list if it does not already exist in the list.

Figure 14:
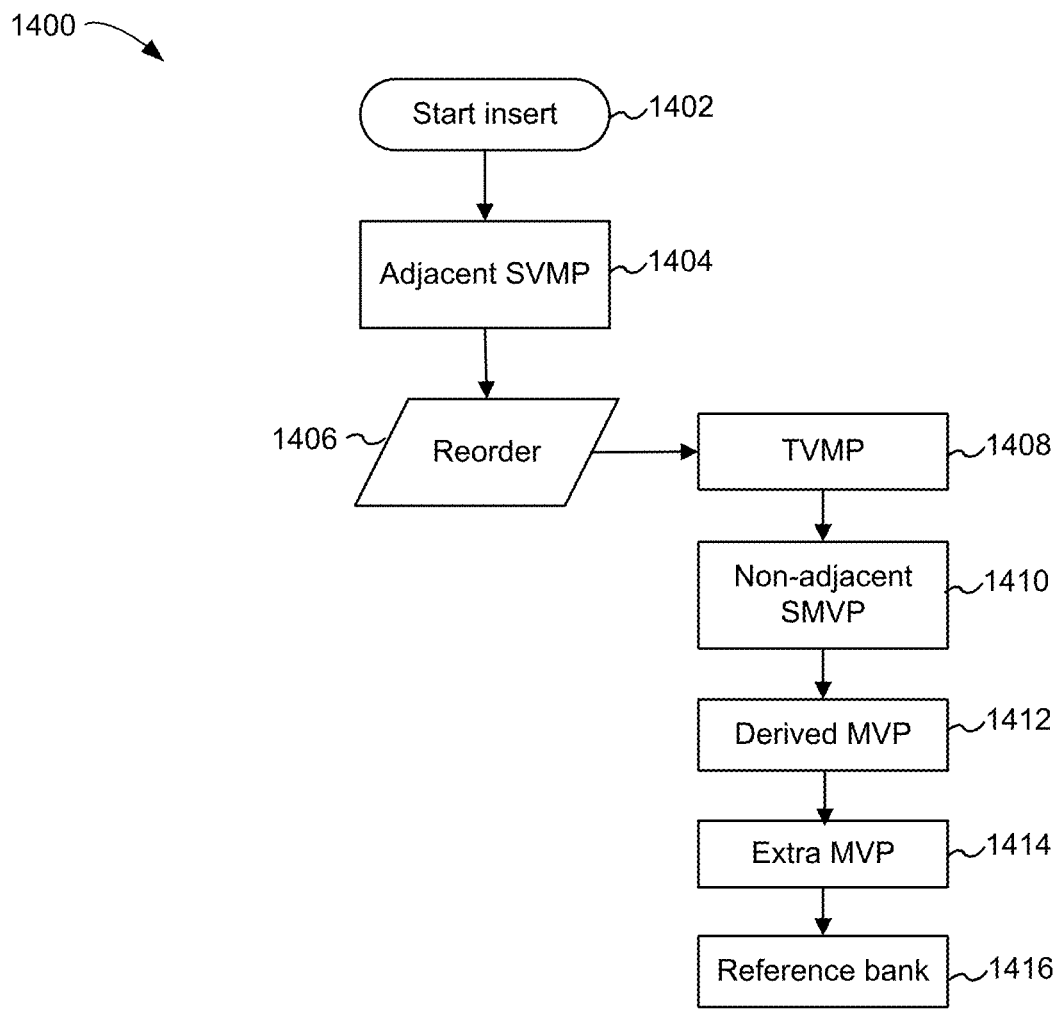
FIG. 14 illustrates a process for constructing a MVP list, in accordance with some embodiments.

FIG. 14 illustrates a process 1400 for constructing a motion vector predictor (MVP) list, in accordance with some embodiments. In some embodiments, the MVP list is constructed in the following order with full pruning. In some embodiments, the process starts (1402) by inserting adjacent SMVP (1404). The process includes a reordering step 1406 for the existing candidates, followed by TMVP 1408, non-adjacent SMVP 1410, derived MVP candidates 1412, extra MVP candidates 1414, and candidates from a reference MV candidate bank 1416 (e.g., reference MV candidate bank 1302).

Figure 15:
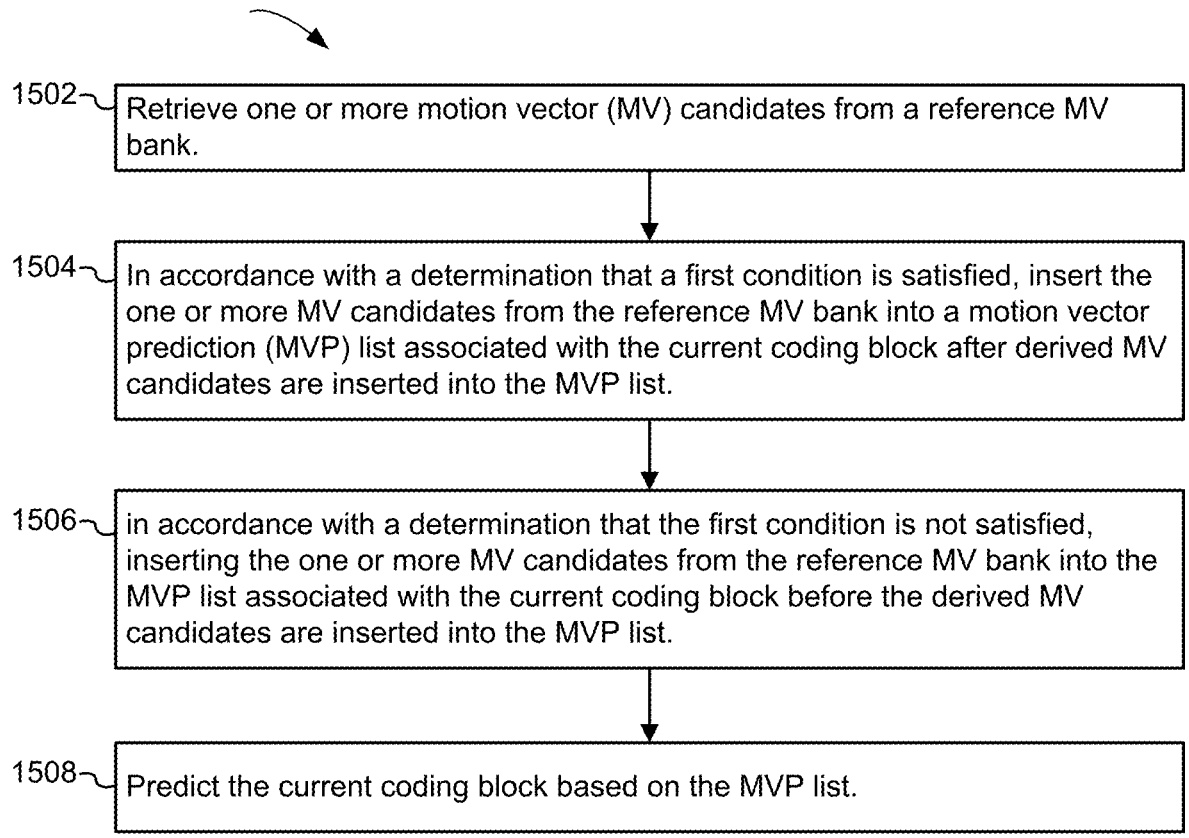
FIG. 15 is a flow diagram illustrating a method for decoding a current coding block, in accordance with some embodiments.

FIG. 15 is a flow diagram illustrating a method 1500 for decoding a current coding block, in accordance with some embodiments. The method 1500 may be performed at a computing system (e.g., the server system 112, the source device 102, or the electronic device 120) having control circuitry and memory storing instructions for execution by the control circuitry. In some embodiments, the method 1500 is performed by executing instructions stored in the memory (e.g., the memory 314) of the computing system.

The system retrieves (1502) one or more motion vector (MV) candidates from a reference MV bank. In accordance with a determination that a first condition is satisfied, the system inserts (1504) the one or more MV candidates from the reference MV bank into a motion vector prediction (MVP) list associated with the current coding block after derived MV candidates are inserted into the MVP list. In accordance with a determination that the first condition is not satisfied, the system inserts (1506) the one or more MV candidates from the reference MV bank into the MVP list associated with the current coding block before the derived MV candidates are inserted into the MVP list. The system predicts (1508) the current coding block based on the MVP list.

In some embodiments, the candidates from the reference candidates bank (e.g., reference MV candidate bank 1302) are inserted into the MVP list prior to derived candidates, such that the MVP list is constructed by the following order: adjacent SMVP, reordering process for the existing candidates, TMVP candidates, non-adjacent SMVP candidates, candidates from reference MV candidate bank, derived candidates, and extra candidates.

In some embodiments, the derived MV candidates are MV predictors derived from either one or more motion vectors in a single reference frame based on an inter prediction mode or a composed motion vector from a plurality of neighboring reference frames in a compound inter prediction mode.

In some embodiments, the candidates from the reference candidates bank are conditionally inserted into the MVP list prior to derived candidates. For example, if one condition is satisfied, the original MVP list order is used; otherwise, if the condition is not satisfied, a new MVP list with different order or content is constructed.

In some embodiments, the candidates from the reference candidates bank are conditionally inserted into the MVP list prior to derived candidates. For example, if one condition is satisfied, the original MVP list order is used; otherwise (e.g., if the condition is not satisfied), the MVP list is constructed by the following order: adjacent SMVP, reordering process for the existing candidates, TMVP candidates, non-adjacent SMVP candidates, candidates from reference MV candidate bank, derived candidates, extra candidates.

In some embodiments, if the condition width≥N and/or height≥N is satisfied (e.g., N can be equal to, and is not limited to, 8, 16, 32, or 64 luma samples), the original MVP list order is used (e.g., candidates from reference MV candidate bank inserted at the very end of MVP list), otherwise, if width<N or height<N, candidates from reference MV candidate bank are inserted before derived candidates.

In some embodiments, if the condition width≥N and/or height≥N is satisfied (e.g., N is equal to, and not limited to, 8, 16, 32, or 64 luma samples), the original MVP list order is used (e.g., candidates from reference MV candidate bank put at the very end of MVP list), otherwise, if width<N and height<N, candidates from reference MV candidate bank are inserted before derived candidates.

In some embodiments, if the condition width× height≥N×N is satisfied (e.g., N is equal to, and not limited to, 8, 16, 32, or 64 luma samples), the original MVP list order is used (e.g., candidates from reference MV candidate bank put at the very end of MVP list), otherwise, if width× height<N×N, candidates from reference MV candidate bank will be inserted before derived candidates.

In some embodiments, if the current MV coding mode contains "NEAR" (e.g., for single reference case, NEARMV, or for compound reference case, NEAR_NEWMV, NEW_NEARMV, NEAR_NEARMV, and their extensions, such as optical flow), the original MVP list order is used (e.g., candidates from reference MV candidate bank put at the very end of MVP list), otherwise, if the current MV coding mode does not contain "NEAR" (e.g., NEWMV for single reference and NEW_NEWMV and JOINT_NEWMV for compound reference, and their extensions such as optical flow), candidates from reference MV candidate bank are inserted before derived candidates.

In some embodiments, if the current MV coding mode contains NEAR for each reference frame list (e.g., for single reference case, NEARMV, for compound, NEAR_NEARMV, and their extensions, such as optical flow), the original MVP list order is used (e.g., candidates from reference MV candidate bank put at the very end of MVP list), otherwise, if the current MV coding mode does not contain NEAR for all the reference frame lists (e.g., NEWMV for single reference and NEW_NEWMV, NEAR_NEWMV, NEW_NEARMV and JOINT_NEWMV for compound reference, and their extensions such as optical flow), candidates from reference MV candidate bank are inserted before derived candidates.

In some embodiments, if the current motion mode is translational, the original MVP list order is used; otherwise (e.g., the motion mode is warp or obmc), a new MVP list with different order or content is constructed Although FIG. 15 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 1500) for decoding a current coding block. In some embodiments, the method is performed at a computing system (e.g., the server system 112) having memory and control circuitry. In some embodiments, the method is performed at a coding module (e.g., the coding module 320). The method includes retrieving one or more motion vector (MV) candidates from a reference MV bank. The method includes, in accordance with a determination that a first condition is satisfied, inserting the one or more MV candidates from the reference MV bank into the MVP list associated with the current coding block after derived MV candidates are inserted into the MVP list; in accordance with a determination that the first condition is not satisfied, inserting the one or more MV candidates from the reference MV bank into the MVP list associated with the current coding block before the derived MV candidates are inserted into the MVP list; and predicting the current coding block based on the MVP list.

(A2) In some embodiments of A1, the one or more MV candidates include a spatial MV predictor (SMVP) derived from spatial neighboring blocks adjacent to the current coding block. This is illustrated in FIG. 8.

(A3) In some embodiments of A1 or A2, the first condition comprises at least one of: (i) a condition that the current coding block has a width that is at least equal to N luma samples; and (ii) a condition that the current coding block has a height that is at least equal to N luma samples, wherein N is an integer that is at least 8.

(A4) In some embodiments of any of A1-A3, the first condition includes (i) a first sub-condition that the current coding block has a width that is at least equal to N luma samples; and (ii) a second sub-condition that the current coding block has a height that is at least equal to N luma samples, wherein N is an integer that is at least 8

(A5) In some embodiments of any of A1-A4, when the first condition is not satisfied, the MVP list comprises an order of: an adjacent SMVP, a reordered sequence of MV candidates, a temporal motion vector predictor (TMVP) candidate, a non-adjacent SMVP candidate, a second candidate from the reference MV candidate bank, and a derived candidate.

(A6) In some embodiments of any of A1-A5, the first condition comprises a condition that a product of a width of the current encoding block and a height of the current encoding block is at least equal to N×N, wherein N is an integer representing a number of luma samples and N is at least 8.

(A7) In some embodiments of any of A1-A6, the first condition comprises a condition that a current MV coding mode includes a term "NEAR" (e.g., NEARMV for the single reference case; or for compound reference case, NEAR_NEWMV, NEW_NEARMV, NEAR_NEARMV, and their extensions, such as optical flow).

(A8) In some embodiments of any of A1-A7, the first condition comprises a condition that a current MV coding mode comprises a NEAR mode for each reference frame list in a video stream obtained by the computing system.

(A9) In some embodiments of any of A1-A8, the first condition comprises a condition that a current motion mode is a translational mode.

(A10) In some embodiments of any of A1-A9, the derived MV candidates are MV predictors derived from either a motion vector (or one or more motion vectors) in a single reference frame based on inter prediction mode or a composed motion vector (or one or more composed motion vectors) from a plurality of neighboring reference frames in a compound inter prediction mode.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A9 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A9 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding a current coding block, performed at a computing system having one or more processors and memory, the method comprising:
   retrieving one or more motion vector (MV) candidates from a reference MV bank;
   in accordance with a determination that a first condition is satisfied, inserting the one or more MV candidates from the reference MV bank into a motion vector prediction (MVP) list associated with the current coding block after derived MV candidates are inserted into the MVP list;
   in accordance with a determination that the first condition is not satisfied, inserting the one or more MV candidates from the reference MV bank into the MVP list associated with the current coding block before the derived MV candidates are inserted into the MVP list; and
   predicting the current coding block based on the MVP list.

2. The method of claim 1, wherein the one or more MV candidates include a spatial MV predictor (SMVP) derived from spatial neighboring blocks adjacent to the current coding block.

3. The method of claim 1, wherein the first condition comprises at least one of:
   a condition that the current coding block has a width that is at least equal to N luma samples; and
   a condition that the current coding block has a height that is at least equal to N luma samples, wherein N is an integer that is at least 8.

4. The method of claim 1, wherein the first condition includes:
   a first sub-condition that the current coding block has a width that is at least equal to N luma samples; and
   a second sub-condition that the current coding block has a height that is at least equal to N luma samples, wherein N is an integer that is at least 8.

5. The method of claim 1, wherein:
   when the first condition is not satisfied, the MVP list comprises an order of: an adjacent SMVP, a reordered sequence of MV candidates, a temporal motion vector predictor (TMVP) candidate, a non-adjacent SMVP candidate, a second candidate from the reference MV candidate bank, and a derived candidate.

6. The method of claim 1, wherein the first condition comprises a condition that a product of a width of the current encoding block and a height of the current encoding block is at least equal to N×N, wherein N is an integer representing a number of luma samples and N is at least 8.

7. The method of claim 1, wherein the first condition comprises a condition that a current MV coding mode includes a term "NEAR".

8. The method of claim 1, wherein the first condition comprises a condition that a current MV coding mode comprises a NEAR mode for each reference frame list in a video stream obtained by the computing system.

9. The method of claim 1, wherein the first condition comprises a condition that a current motion mode is a translational mode.

10. The method of claim 1, wherein the derived MV candidates are MV predictors derived from either a motion vector in a single reference frame based on inter prediction or a composed motion vector from a plurality of neighboring reference frames in a compound inter prediction.

11. A computing system for decoding a current coding block, the computing system comprising:
   one or more processors;
   memory; and
   one or more programs stored in the memory and configured for execution by the one or more processors, the one or more programs comprising instructions for:
      retrieving one or more motion vector (MV) candidates from a reference MV bank;
      in accordance with a determination that a first condition is satisfied, inserting the one or more MV candidates from the reference MV bank into a motion vector prediction (MVP) list associated with the current coding block after derived MV candidates are inserted into the MVP list;
      in accordance with a determination that the first condition is not satisfied, inserting the one or more MV candidates from the reference MV bank into the MVP list associated with the current coding block before the derived MV candidates are inserted into the MVP list; and
      predicting the current coding block based on the MVP list.

12. The computing system of claim 11, wherein the one or more MV candidates include a spatial MV predictor (SMVP) derived from spatial neighboring blocks adjacent to the current coding block.

13. The computing system of claim 11, wherein the first condition comprises at least one of:
   a condition that the current coding block has a width that is at least equal to N luma samples; and
   a condition that the current coding block has a height that is at least equal to N luma samples, wherein N is an integer that is at least 8.

14. The computing system of claim 11, wherein the first condition includes:
   a first sub-condition that the current coding block has a width that is at least equal to N luma samples; and
   a second sub-condition that the current coding block has a height that is at least equal to N luma samples, wherein N is an integer that is at least 8.

15. The computing system of claim 11, wherein:
   when the first condition is not satisfied, the MVP list comprises an order of: an adjacent SMVP, a reordered sequence of MV candidates, a temporal motion vector predictor (TMVP) candidate, a non-adjacent SMVP candidate, a second candidate from the reference MV candidate bank, and a derived candidate.

16. The computing system of claim 11, wherein the first condition comprises a condition that a product of a width of the current encoding block and a height of the current encoding block is at least equal to N×N, wherein N is an integer representing a number of luma samples and N is at least 8.

17. The computing system of claim 11, wherein the first condition comprises a condition that a current MV coding mode includes a term "NEAR".

18. The computing system of claim 11, wherein the first condition comprises a condition that a current MV coding mode comprises a NEAR mode for each reference frame list in a video stream obtained by the computing system.

19. The computing system of claim 11, wherein the first condition comprises a condition that a current motion mode is a translational mode.

20. A non-transitory computer-readable storage medium storing one or more programs configured for execution by a computing device having one or more processors and memory, the one or more programs comprising instructions for:
- retrieving one or more motion vector (MV) candidates from a reference MV bank;
- in accordance with a determination that a first condition is satisfied, inserting the one or more MV candidates from the reference MV bank into a motion vector prediction (MVP) list associated with a current coding block after derived MV candidates are inserted into the MVP list;
- in accordance with a determination that the first condition is not satisfied, inserting the one or more MV candidates from the reference MV bank into the MVP list associated with the current coding block before the derived MV candidates are inserted into the MVP list; and
- predicting the current coding block based on the MVP list.

* * * * *